United States Patent
Sandman et al.

(10) Patent No.: US 10,586,267 B2
(45) Date of Patent: Mar. 10, 2020

(54) METHOD AND SYSTEM FOR PRODUCT DISCOVERY

(71) Applicant: Curio Search, Inc., Atlanta, GA (US)

(72) Inventors: Christopher Sandman, Altanta, GA (US); Bharat Vijay, Milpitas, CA (US); Anand Ramani, Bangalore (IN); Ram Bhoopalam, Milpitas, CA (US)

(73) Assignee: Curio Search, Inc., Milpitas, CA (US)

( * ) Notice: Subject to any disclaimer, the term of this patent is extended or adjusted under 35 U.S.C. 154(b) by 432 days.

(21) Appl. No.: 15/419,861

(22) Filed: Jan. 30, 2017

(65) Prior Publication Data

US 2017/0221127 A1     Aug. 3, 2017

Related U.S. Application Data (60) Provisional application No. 62/288,564, filed on Jan. 29, 2016.

(51) Int. Cl.
*G06Q 30/06*     (2012.01)

(52) U.S. Cl.
CPC .................................. *G06Q 30/0631* (2013.01)

(58) Field of Classification Search
None
See application file for complete search history.

(56) References Cited

U.S. PATENT DOCUMENTS

| | | | | |
|---|---|---|---|---|
| 7,058,516 B2* | 6/2006 | Mascarenhas | ........ | G06F 16/353 702/19 |
| 7,102,067 B2* | 9/2006 | Gang | ..................... | G06Q 30/02 84/600 |
| 7,174,312 B2* | 2/2007 | Harper | ............... | G06Q 10/0635 705/35 |
| 8,494,978 B2* | 7/2013 | Pinckney | ............... | G06Q 30/02 706/11 |
| 8,504,440 B1* | 8/2013 | Kolawa | .................. | G06Q 30/00 705/26.7 |
| 8,751,429 B2* | 6/2014 | Dillon | ...................... | G06N 5/02 706/46 |
| 10,102,307 B2* | 10/2018 | Han | ........................ | G06F 16/90 |

(Continued)

FOREIGN PATENT DOCUMENTS

WO     WO-2014144833 A3 *   8/2015    ........... G06F 16/437

OTHER PUBLICATIONS

Anon., "Tower Records First to Deploy Music Discovery Center Kiosk from NCR, Savage Beast; Self-Service Kiosk Helps Shoppers Navigate Music Catalog, Find Music They Like," Business Wire, Jun. 10, 2002:2610. (Year: 2002).*

(Continued)

*Primary Examiner* — Nicholas D Rosen
(74) *Attorney, Agent, or Firm* — HM Law Group LLP; Vanintheran Moodley (57) ABSTRACT

A method for generating recommendations for a user from a product database is provided. The method comprises determining a taxonomy for the product database, said taxonomy comprising a plurality of attributes assigned to each product in the product database; performing an exploratory procedure in which the user is systematically exposed to products from the product database in order to test the user's preference for products in the product database; and generating a style profile for the user based on the user's indicated preferences.

15 Claims, 9 Drawing Sheets

(56) References Cited

U.S. PATENT DOCUMENTS

| | | | | |
|---|---|---|---|---|
| 2003/0014428 A1* | 1/2003 | Mascarenhas | G06F 16/353 | |
| 2003/0055516 A1* | 3/2003 | Gang | G06Q 30/02 | 700/94 |
| 2003/0163399 A1* | 8/2003 | Harper | G06Q 10/0635 | 705/35 |
| 2005/0256771 A1* | 11/2005 | Garret | G06Q 30/02 | 705/14.25 |
| 2010/0223157 A1* | 9/2010 | Kalsi | G06Q 30/06 | 705/26.1 |
| 2010/0312724 A1* | 12/2010 | Pinckney | G06Q 30/02 | 706/11 |
| 2010/0313141 A1* | 12/2010 | Yu | G06Q 30/02 | 715/747 |
| 2011/0184831 A1* | 7/2011 | Dalgleish | G06Q 30/02 | 705/26.7 |
| 2012/0036084 A1* | 2/2012 | Barbieri | G06F 16/958 | 705/347 |
| 2013/0339348 A1* | 12/2013 | Pickelsimer | G06Q 30/0631 | 707/723 |
| 2014/0012794 A1* | 1/2014 | Dillon | G06N 5/02 | 706/46 |
| 2014/0025533 A1* | 1/2014 | Lv | G06Q 30/0631 | 705/26.7 |
| 2014/0143838 A1* | 5/2014 | Eversoll | G06F 21/6254 | 726/4 |
| 2014/0172501 A1* | 6/2014 | Meshulam | G06Q 30/0631 | 705/7.29 |
| 2014/0236870 A1* | 8/2014 | Dillon | G06N 5/02 | 706/11 |
| 2014/0279817 A1* | 9/2014 | Whitman | G06F 16/437 | 706/52 |
| 2014/0280214 A1* | 9/2014 | Han | G06F 16/90 | 707/748 |
| 2015/0112791 A1* | 4/2015 | Jain | G06Q 30/0269 | 705/14.41 |

OTHER PUBLICATIONS

Dong, J., et al., "A Recommendation System Based on Multi-Attribute," in "2016 9th International Conference on Service Science (ICSS)," pp. 165-169, Oct. 1, 2016. (Year: 2016).*

* cited by examiner

METHOD AND SYSTEM FOR PRODUCT DISCOVERY

FIELD

Embodiments of the present invention relate to product discovery.

BACKGROUND

Technology exists for recommending products to customers. For example, technology exists to recommend a movie to a customer based on an understanding of what movies the customer previously enjoyed, and based on classifying the customer with other moviegoers of similar movie taste.

The above-described technology for recommending products is for the most part based on historical information indicating the customer's preferences. Thus, recommendations of products that are drastically dissimilar to products the customer has previously enjoyed will not be made. Moreover, there are certain categories of products where a customer's history is not a good indicator of what products a customer would like. For example, consider the case where product is being purchased based on its aesthetic qualities. An example of such a product is an item of furniture. In this case, the customer's historical preferences with regard to items of furniture may not be a good indicator of whether the customer will like a particular piece of furniture even if said piece of furniture is similar to items of furniture that the customer has previously liked. Thus, for products where purchasing is driven by aesthetics, it is important to show a customer different products and to engage the customer in a discovery process in order to uncover products that the customer would like.

SUMMARY

Embodiments of the present invention disclose techniques for discovering products that a customer likes based on a taste profile for the customer. The taste profile for the customer may be based on product styles, product affinities, and similarities between customers. In accordance with some embodiments, customers are shown products, and the customer's preference with regard to the products in the form of a "like", or a "dislike", are captured. The customer's preference is then used to identify products to recommend to the customer based on product affinities.

Other aspects of invention rebound from the detailed description below you will be apparent from the detailed description below.

DETAILED DESCRIPTION OF SOME EMBODIMENTS

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a technique for product recommendations. Advantageously, the technique makes recommendations of products based on a customer's taste, as well as on product affinities. In some cases, the recommendation may be supplemented by input from a professional, such as an interior designer, as will be explained.

The recommendation technique of the present invention may be used for various products, particularly products that are purchased based on aesthetic appeal. For purposes of description of the invention, the technology will be described with reference to products in the form of items of furniture. In particular, the use case where a customer wishes to furnish a particular space/room will be described. However, it is to be understood that the present technology may be applied to provide recommendations for other products such as apparel, jewelry, etc. Thus, the description of the technology with respect to furniture is intended to be non-limiting.

Figure 1:
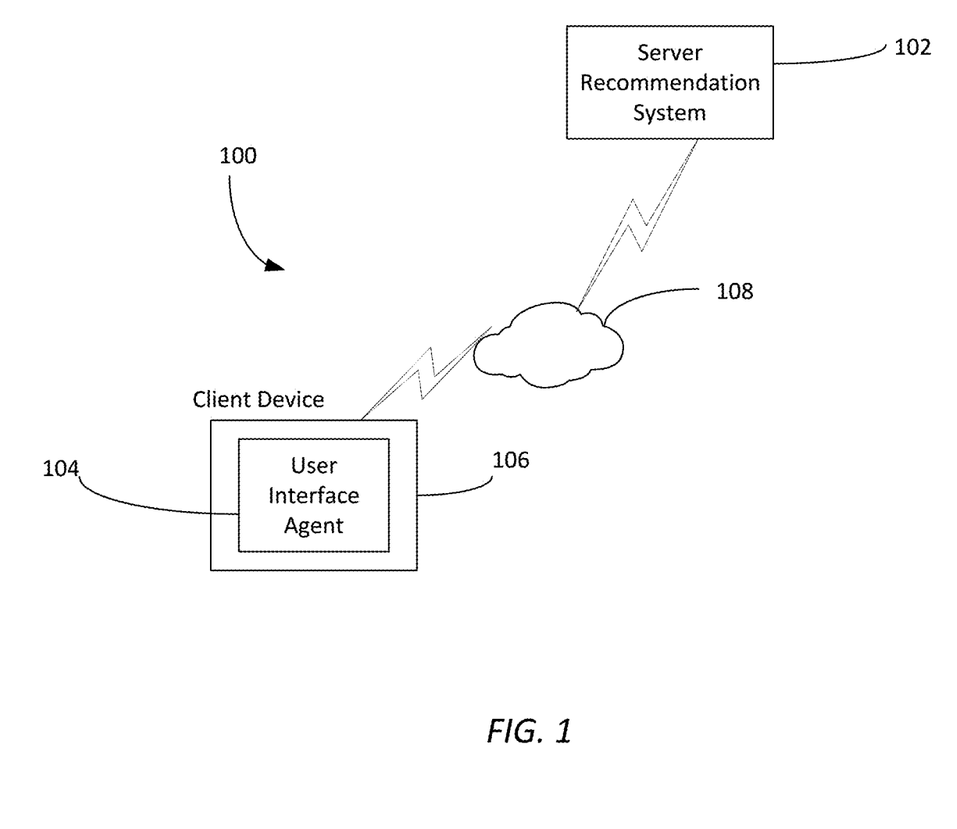
FIG. 1. shows a set up for practicing embodiments of the present invention.

Referring now to FIG. 1 of the drawings, is setup 100 for practicing the recommendation techniques of the presentation is shown. The setup 100 includes a server recommendation system 102. The system 102 may include one or a plurality of servers deployed at a single location, or distributed geographically. For example, in one embodiment the system 102 may be deployed as a cloud-based system. The system 102 includes modules, databases, computing resources etc. necessary to implement the recommendation techniques disclosed herein, as one of ordinary skill in the art would understand.

The setup 100 also includes a plurality of client devices 104 (only one of which is shown in FIG. 1). A client device 104 may take various forms, such as my smart phone, a tablet device, a PC, a laptop, etc. for the purposes of description, the client device 104 comprises a smart phone. Among other components, the smart phone 104 may be equipped with a user interface agent 106, which may take the form of a web browser. The smart phone 104 is communicatively coupled to the server recommendation system 102 by means of an intermediate wide area network 108. In one embodiment, the network 108 may represent various technologies including Internet, and wireless networking technologies.

Figure 2:
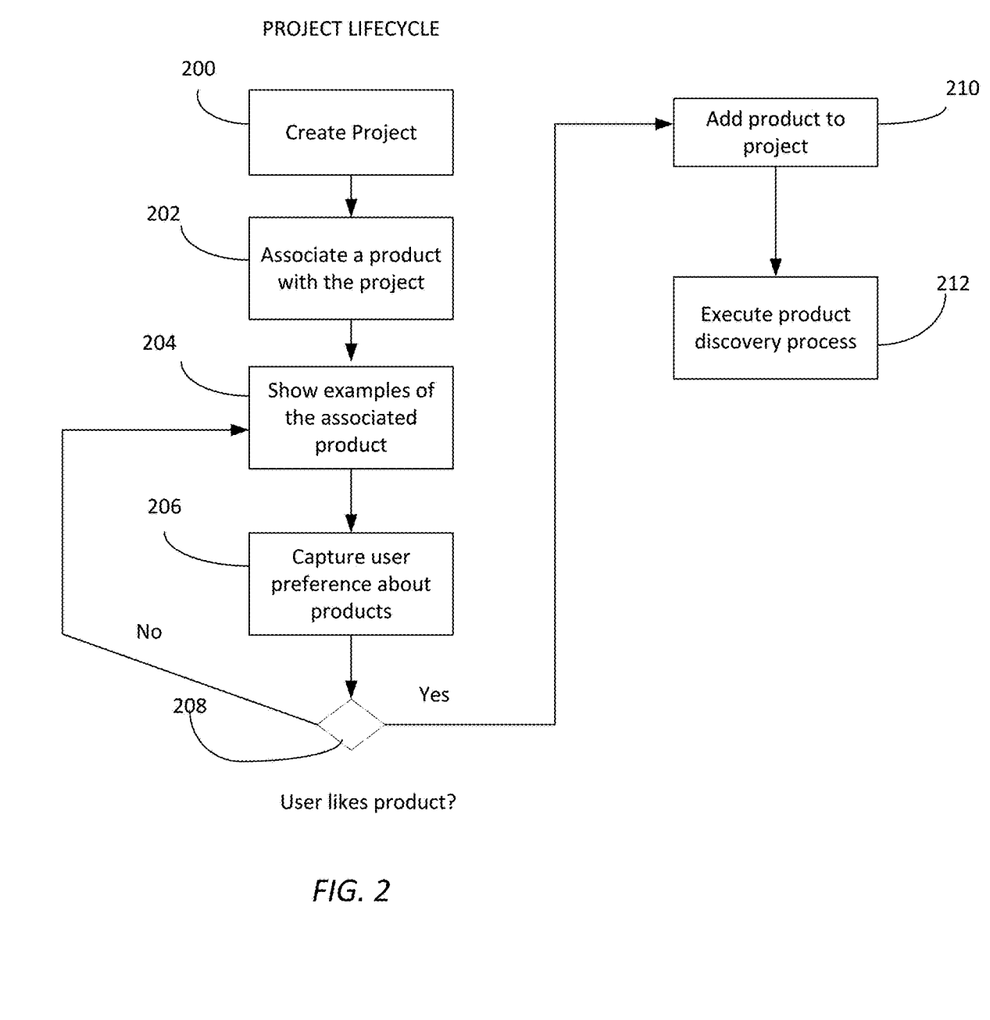
FIG. 2 shows a project lifecycle, in accordance with one embodiment of the invention.
Figure 3:
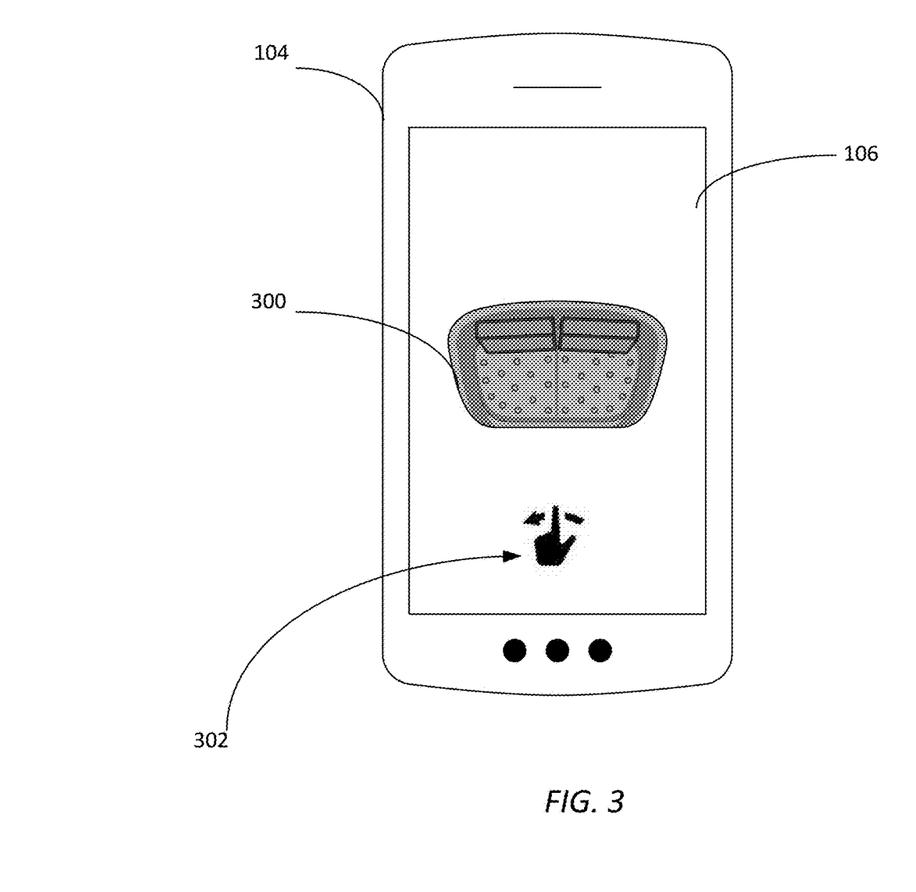
FIG. 3 shows an instance of the product being shown to user, in accordance with one embodiment of the invention.

In accordance with one embodiment, the system 102 is configured to allow a user to create a project. Examples of projects include a project to furnish a particular space such as for example a living room, a dining room, a bedroom, etc. FIG. 2 of the drawings shows a project lifecycle, in accordance with one embodiment of the invention. Referring to FIG. 2, at block 200 the system 102 allows the user to create a project. For example, using the smart phone 104, the user may launch a "recommender client application" provisioned in the smart phone 104 which is communicatively coupled with a "recommender server application" provisioned in the system 102. The "recommender server application" may also be referred to herein as "the Recommender". The recommender client application may be used to create the project. At block 202, a product is associated with the project. For example, the user may be allowed to select a product from catalog of products associated with the project. The selected product is then associated with the project. To be clear, if the project is to furnish a living room, then the user may associate a sofa (product) with the project. At block 204, the customer is shown examples of the associated product. For example, for the case of the product being a sofa, multiple images of the sofa will be shown to the customer. At block 206, the user's preference about the products shown are captured. FIG. 3 shows an instance 300 of a sofa being displayed to the user under the block 204. In one embodiment, the user's preference in relation to the instance 300 may be captured through the user action of a "swipe". In particular, the user swiping in a particular direction causes the image being displayed to be replaced by another image. For example, the latter image may be an image of another instance of the product. A particular meaning may be assigned to the direction of the swipe. For example, a swipe to the left may indicate that the user does not like the instance, whereas a swipe to the right may indicate that the user likes the instance. The example shown in FIG. 3 the action of the user's swipe is indicated by reference 302. As will be seen, the swipe direction is to the left, thus indicating that the user does not like the instance 300 of the sofa (product). In some cases, a swipe down my cause the particular item being viewed to be saved.

Referring again to FIG. 2 of the drawings, at block 208 a determination is made as to whether the user likes or dislikes each instance of the product shown. As noted above, the user's preference determined based on the direction of the swipe. In one embodiment, items that are saved are assumed to be liked by a user. If the user does not like a particular instance, then control passes back to block 204 where more instances are shown to the user. If, however, the user does like a particular instance then the product/instance is added to the project at block 210. At block 212, a product discovery process is executed in order to discover more products for the user, as will now be explained.

Figure 4:
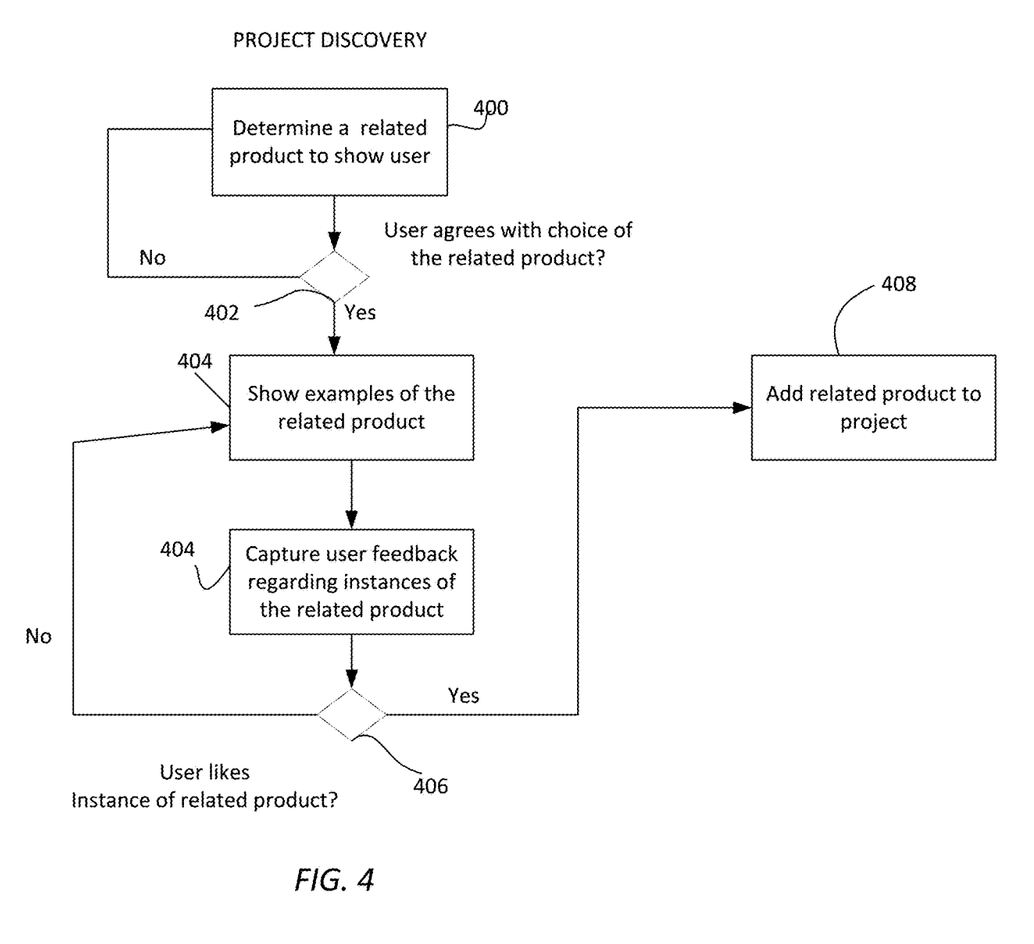
FIG. 4 shows a flowchart of operations performed for product discovery, in accordance with one embodiment of the invention.

FIG. 4 of the drawings shows a flowchart of operations performed for the product discovery process, in accordance with one embodiment of the invention. Referring to FIG. 4, at block 400 the recommender server application determines a related product to show to the user. In one embodiment, the recommended product is based on the product added to the project at the block 210, described above with reference to FIG. 2. To generate a product recommendation, the system 102 may maintain information on product affinities. Broadly, certain products have an affinity in the sense that they are usually purchased together. For example, a sofa and a side-table may usually be purchased together. Thus, given a sofa as the product added to the project at block 210, a side-table will be selected as a related product to show to the user because of the affinity between a side-table and a sofa.

Figure 7:
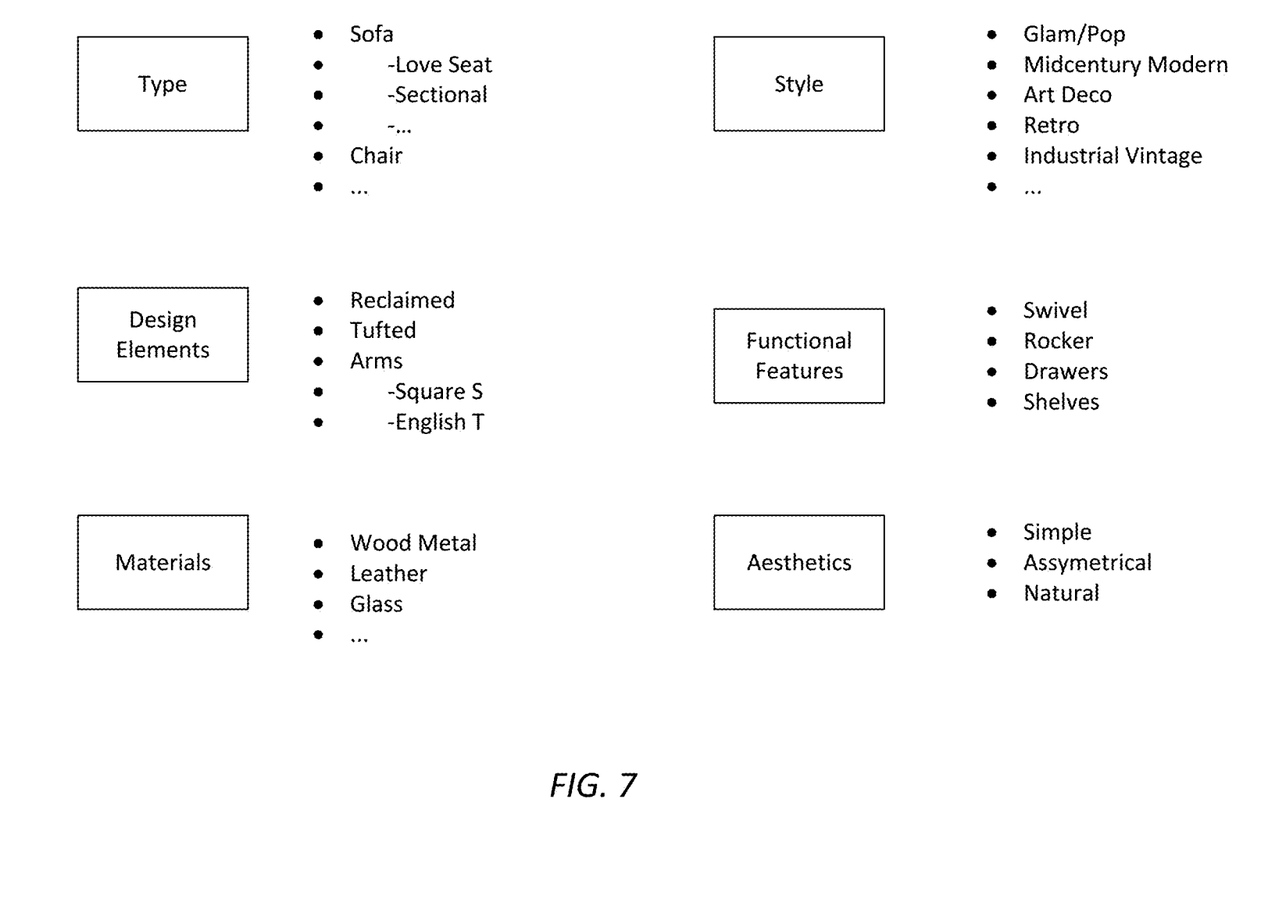
FIG. 7 shows some example of dimensions along which product affinities may be measured, in accordance with one embodiment of the invention.

In one embodiment, product affinity may be measured based on multiple dimensions. FIG. 7 shows an example of the dimensions that may be used when recommending products. As will be seen, products may be recommended based on type, design elements, materials, style, functional features, and aesthetics.

At block 402 it is determined if the user agrees with the choice of related product. The user's choice may be captured, in one embodiment by the user's selection of a like, or a dislike button associated with the chosen related product. If the user likes the related product then control passes to block 404, otherwise control passes back to block 400 where another related product is chosen based on affinity. At block 404, examples of instances of the related product are shown to the user. The block 404 is similar to the block 204 described with reference to FIG. 2. Control then passes to block 406, which is similar to the block 208. Finally, the block 408 is executed, which is similar to the block 210.

Figure 5:
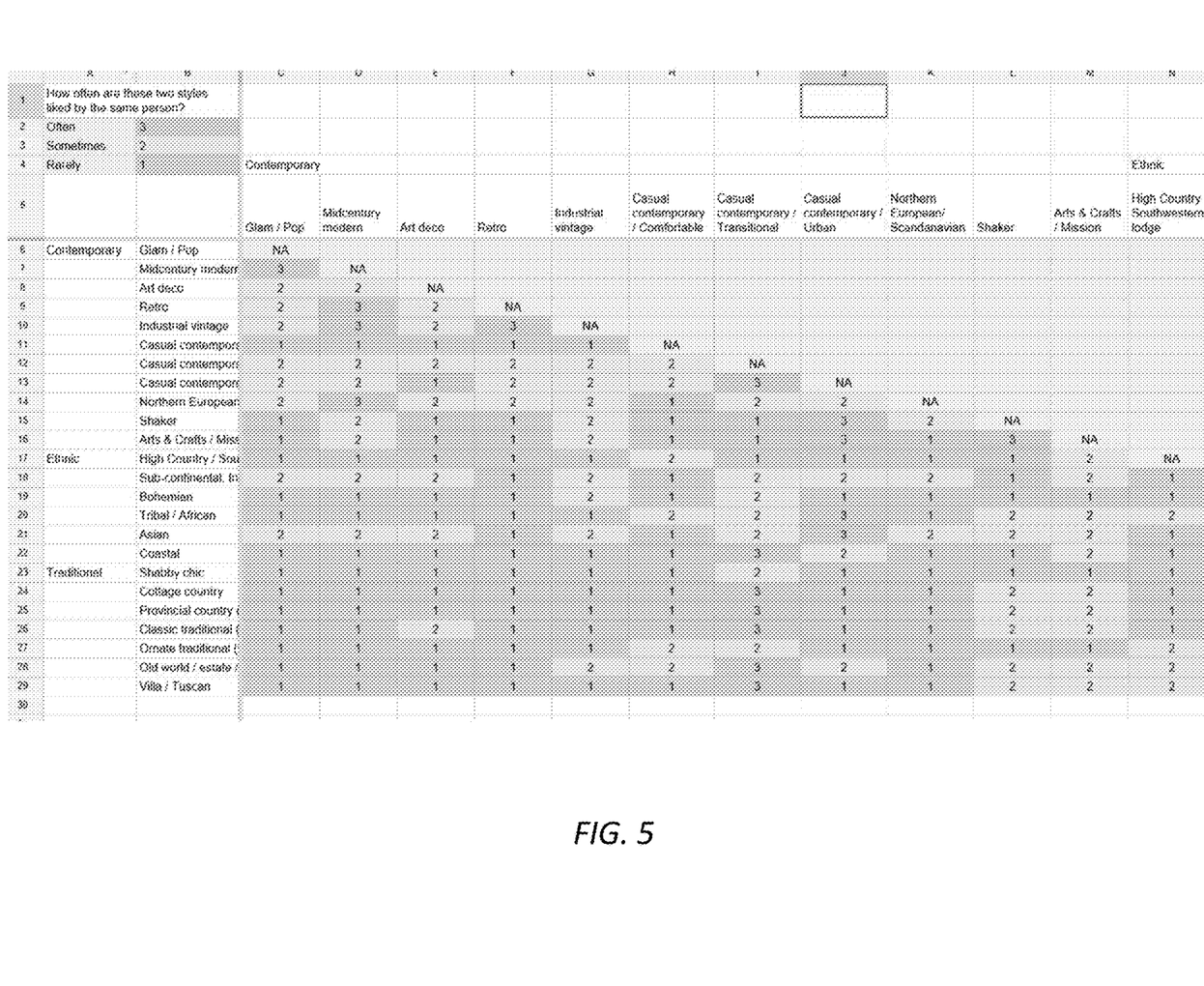
FIG. 5 a style mapping, in accordance with one embodiment of the invention.

In one embodiment, the instances or examples of a particular product to be shown to the user are selected based on styles. For example, a particular item of furniture may include several styles such as contemporary, ethnic, traditional, etc. Within each style category, there may be sub-styles. For example, the contemporary style may include sub-styles selected from the group comprising glam/pop, midcentury modern, art deco, etc. In one embodiment, a style mapping may be used to track how often to styles a liked by the same person. An example of a style mapping is shown in FIG. 5 of the drawings. Referring to the style mapping, numbers are used to indicate how often the user liking one style also likes another. For example, the number "3" indicates often, the number "2" indicates sometimes, and the number "1" indicates rarely. Thus, the style mapping shows that the user happens to like the styles "Contemporary—Midcentury Modern" and "Contemporary—Glam/Pop" often, whereas the user likes the style "Ethnic—Asian" and "Contemporary—Retro", rarely. Thus, it will be seen that the style mapping shows affinities between styles. The information contained in the style mapping is used, in one embodiment of the invention, to select particular styles to show to user as follows:

if it is determined that the user likes a particular style, then use the style affinities as indicated by the style mapping to expose the user to other styles with high affinity to the particular style The recommender server application, may support the following API functions, in accordance with one embodiment of the invention:
1. getList (user, project, category)—Returns a list of all matching SKUs and a score for each item in the list
2. getFixedList (user, project, category, size)—Returns a list of size elements of all matching SKUs
3. getListbyKeyword (user, project, keyword)—Returns a list of all matching Curio SKUs which are relevant to a key phrase
4. getFixedListbyKeyword (user, project, keyword, size)—List of all relevant SKUs up to a maximum of size elements.

As indicated above, the recommender server application may be configured to understand how products are related to each other (affinities). Thus, given a sofa, the recommender server application is able to find relevant coffee tables, loveseats, recliners, etc. that may go with the sofa. In one embodiment, the recommender server application may utilize an Affinity Graph. In the affinity graph, each node will be a SKU (which can correspond to an SKU from a merchant site). The edges will determine the correlation from one node to another. Multiple scores may be kept at each edge, corresponding to
1. Attribute based similarities—if it is determined that the styles are similar and these two items complement each other like a sofa in contemporary style and the corresponding loveseat.
2. Site User affinity based similarities—People who bought x also bought y. Or people who viewed x also viewed y.
3. End User interaction—Did the user like this edge or not? Did the user create this edge? For example, if the user finds a loveseat through a sofa and another coffee table through a sofa, then a new edge can be created from the coffee table to the loveseat.

Figure 6:
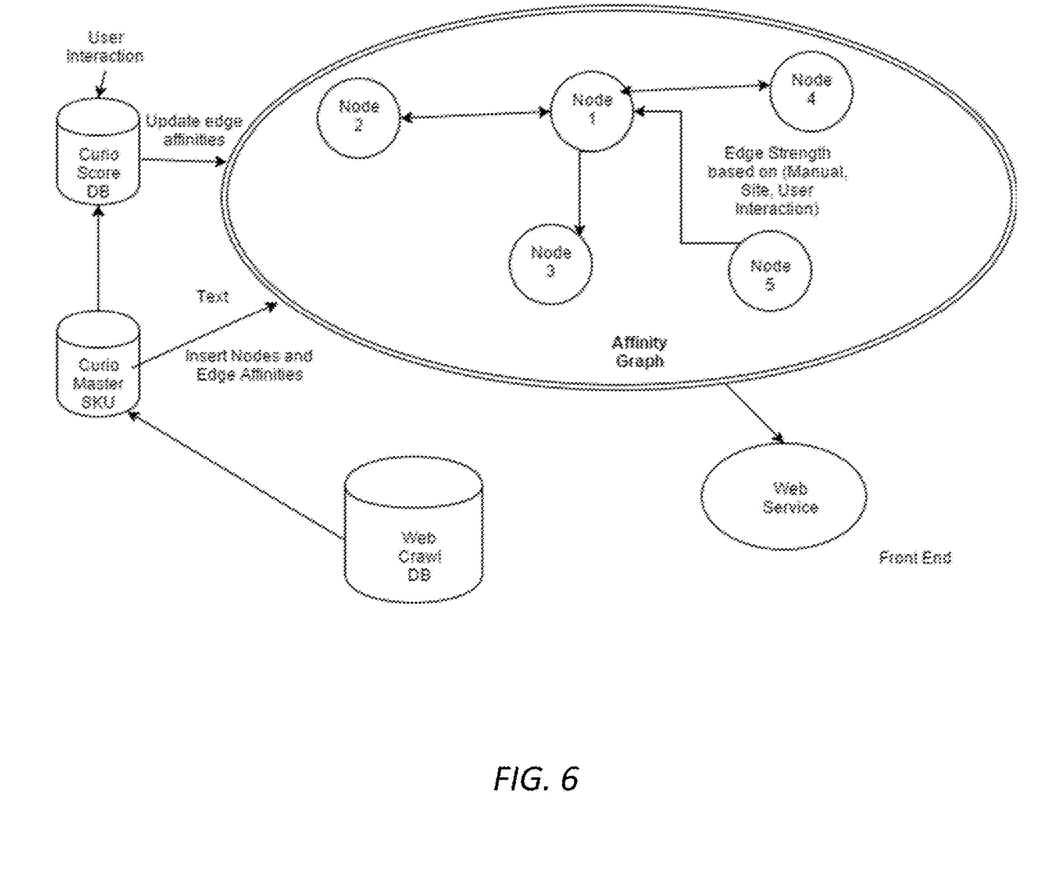
FIG. 6 shows a high-level system architecture for a recommender application, in accordance with one embodiment of the invention.

FIG. 6 of the drawings shows a high-level system architecture for the recommender server application, in accordance with one embodiment of the invention. The algorithm for recommending products may be built into the Affinity graph. In one embodiment, Neo4j may be used for the Affinity graph The Affinity Algorithm may use a graph structure to find relevant items for any given query. The graph has the following indexes:
1. SKU Index—Indexes each SKU This will be useful when a project contains multiple SKUs.
2. Category Index—Indexes each category like sofa, loveseat, etc. This will be useful when a query is made for items within a category.
3. Popularity Index—Indexes items by popularity, useful to get a list of items by popularity.

The Affinity Algorithm may operate as follows, in accordance with one embodiment:
There could be many starting points for a search. For example, a user looking for a side table for a living room where she has already chosen a sofa and a loveseat will have 2 starting points—the sofa and the loveseat. Each item will find side tables that have an affinity to them. This gives rise to two sets—the Union Set and the Intersection Set. We can think of the Intersection Set as being smaller and very specific and the Union Set as being larger and broader. We can rank items higher based on how close to the Intersection set they are.

```
For every node in {Starting_Points}
    Find all the edges from this node in descending order of edge
    priority (see below)
        For each node connected to the edge
            If node is NOT in the set {End Points} then
                If node matches search criteria
                    Add node to set {End Points}
                    Add node to set {Starting Points}
            Else
                Increment the NodeScore for this Node in the set
                {End Points}
Process and sort set {End Points} -> {Processed End Points}
    Sort set by the Learning Score which is based on Node Score,
Manually Classified Data Score, End User Reviews, End User Affinity
Score
Return {Processed End Points}
```

The graph technology allows for finding starting points through:
1. Indexes on category
2. Edges related to one or more products in the current project.

The advantage of multiple starting points is a better discovery process.

Edge Priority Calculation—Edge Priorities are determined by a Learning Score which may be implemented as a based scoring engine or as a machine learned score based on building a model to formulate the mathematical relationship between the Manually Classified Data Score, End User Reviews, End User Affinity Score, Textually extracted affinity scores and the Learning Score. The Edge Priority Calculation can further use textual attributes for the category and can arrive at different models for subsets of the data for example from sofas to loveseat. The Edge Priority Calculation may be static or dynamic.

Advantageously, the techniques disclosed herein may be used to determine a user's taste profile based on quickly exposing the user to a plurality of product images, and allowing the user to interact with those images in order that the system may determine a taste profile for the user. As described, a user taste profile may be constructed based on product affinities. Additionally, in some embodiments, a product exploration process may be executed in order to uncover additional products over and beyond what would ordinarily be recommended based on product affinities. In one embodiment, during the product installation process, the user may be shown random images from a product database in order to determine the user's preference with regard to the random images. Advantageously, the random images are not selected based on product affinities. This allows the user to explore products that are not related.

In some embodiments, in addition to product affinities, and random exploration, a uses taste profile may be based on similarity with other users. For example, if a user is testified to be similar in terms of taste to other users, then product items liked by the other users, may advantageously be recommended to said user.

As indicated above, the present search technology may be used to provide recommendations for any type of product. At a minimum, the needs to be a taxonomy that describes each product in a product database in terms of multiple dimensions/attributes. For the case of furniture, the following taxonomy may be used, in one embodiment:

| Style | Color | Pattern | Material | Retailer/Brand |
|---|---|---|---|---|
| Modern | Red | Solid | Leather | Affordable Modern |
| Industrial | Blue | Striped | Fabric | West Elm |
| Vintage | Green | Geometric | Metal | . . . |
| Urban | White | Floral | Wood | Affordable Traditional |
| Country | Black | Graphic | Acrylic | Ashley Homestore |
| Eclectic | Gray | Textured | Stone | . . . |
| Classic | . . . | . . . | . . . | High-end Modern Design Within Reach |
| . . . | | | | . . . |
| | | | | Traditional Ethan Allen |
| | | | | . . . |
| | | | | Contemporary Restoration Hardware |
| | | | | . . . |
| | | | | Big Box Walmart |
| | | | | . . . |

In some embodiments, the taxonomy may include additional dimensions such as price. The taxonomy provides structure to the data set that the Recommender can use to 'sample' from and collect feedback from the user on. User feedback against these attributes are used to create the user style profile (also referred to herein as a "user taste profile"). In some embodiments, for large dimensions like 'Retailer/Brand' shown above, each dimension may be broken down into sub-groups. This allows the recommendation technology described herein to work more efficiently to test for a user's taste. For example, if a user responds negatively to brands in the 'Affordable Traditional' sub-group, the Recommender can eliminate that sub-group from further exploration without having to test every leaf on that branch.

| Style | Neckline | Shape | Shoulders | Sleeves | Retailer/Brand |
|---|---|---|---|---|---|
| Jersey | Jersey | | Off | Short | Affordable Contemporary Forever 21 H&M etc. Affordable Traditional Anne Taylor Loft Banana Republic etc. High-End Contemporary AYR Bloomingdales etc. |
| A-line Cutout etc. | A-line Cutout etc. | | Single Sleeveless etc. | Long Cap etc. | Long Cap etc. |

A taxonomy similar to the above may be developed for other data sets. For each taxonomy, a set of mutually exclusive dimensions that collectively exhaust the attribute consideration set is required. By structuring the data in this way, the recommendation technology described herein can efficiently test the boundaries of the solution space before quickly narrowing in on the best possible solutions for the user.

Figure 8:
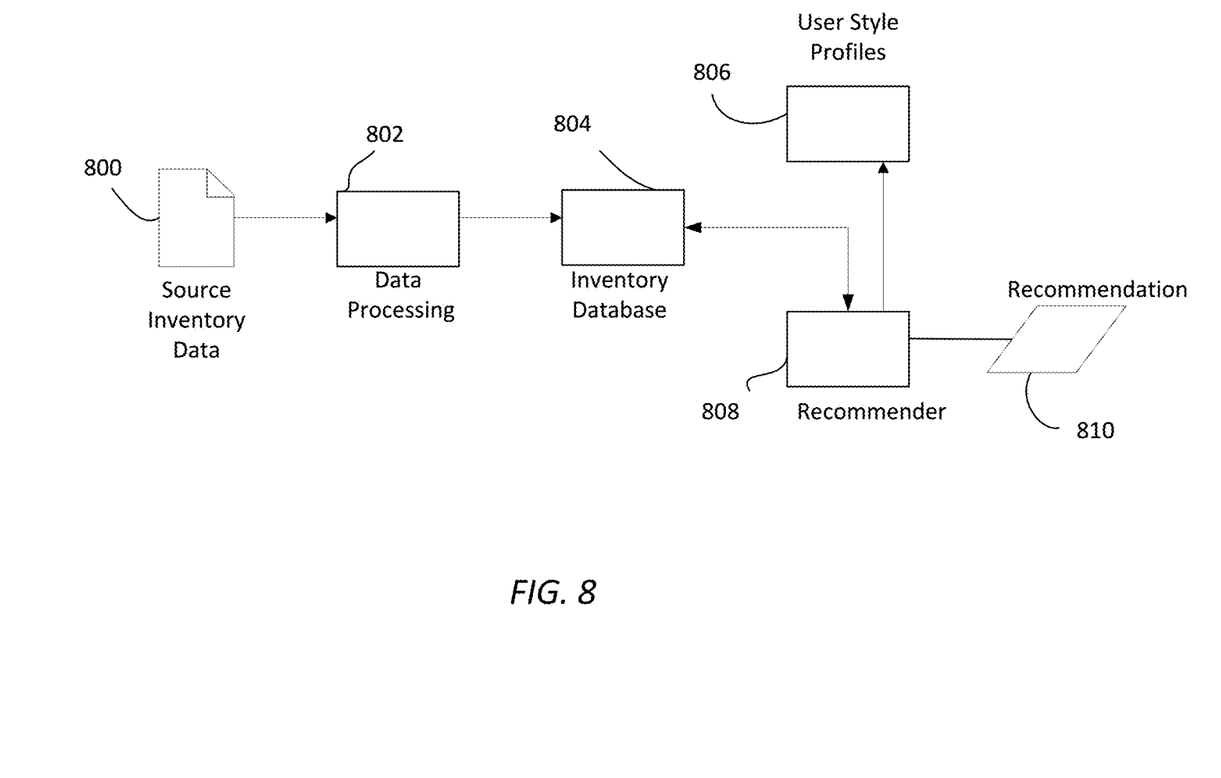
FIG. 8 shows an exemplary system for performing recommendations, in accordance with one embodiment of the invention.

FIG. 8 shows in block diagram of the representative recommendation system for implementing the recommendation techniques described herein, in accordance with one embodiment of the invention. Referring to the drawing, source inventory data 800 is subjected to a data processing step 802. Source inventory data 800 may be collected from multiple sources, including web crawling/scraping, company data feeds (e.g., retailers, marketplaces), and direct entry. In the data processing step 802 each item in the inventory data may be labeled/tagged with attributes based on a taxonomy. Said labeling may be performed through a mix of manual processing, automated/deep learning algorithms, and 'Rosetta Stone' style translation. The labeled inventory data is then stored in an inventory database 804. A recommender component 808 comprises functionality to determine which items to show the user based on an evolving user style profile 806 and the architecture of the taxonomy. In one embodiment, a user's style profile evolves with each interaction recorded by the style machine. Advantageously, the user style profile is highly detailed and collects preference information at the attribute level (attributes are the finest level of detail in the taxonomy). The user style profile may be represented as a multi-dimensional vector that is highly sensitive to both the direction of feedback (positive/negative), and degree (e.g., like, love, as well as the count of each), in accordance with one embodiment. Advantageously, the user style profile is determined based on the user's current preferences and used by the recommender in order to output a recommendation 810 to the style machine. Responsive to receiving the recommendation 810, the style machine changes the image associated with the slot in respect of which user input has been received. Said change and the image includes showing the recommended image included in the recommendation 810.

Figure 9:
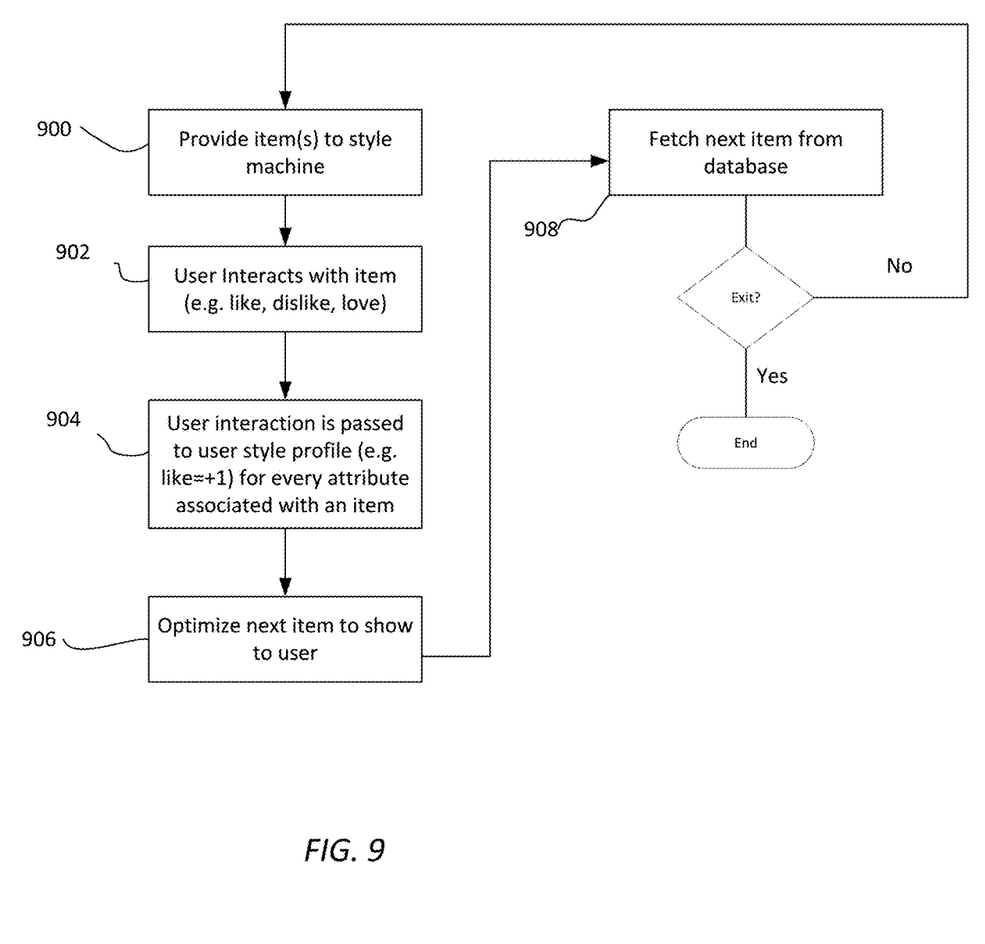
FIG. 9 shows a process for creating a style profile, in accordance with one embodiment of the invention.

FIG. 9 illustrates a process performed by the recommender 908 for creating a user style profile in accordance with one embodiment of the invention. Referring to FIG. 9, at block 900 the recommender 808 provides a recommendation to the style machine to begin the process. For example, the user might have indicated a desire to view sofa designs, in which case the recommendation would provide initial selections of sofas for the establishing to present to the user. At block 902, the user interacts with the information presented, as discussed above. At block 904, each user interaction is recorded in a user style profile against every attribute associated with the item. For example, if the user interaction is the equivalent of a like, then +1 is recorded against every attribute associated with the item. At block 906, the recommender reference is the user style profile to optimize a next item to show to the user. At block 908, the recommender fetch as a next item from the inventoried days to base in the process returns to block 900. This continues until the user exits the style machine at which point the style machine customs of the list of available items to best match the user style profile.

In some embodiments, there system may be configured to utilize more or less of historical data known about the user in the search process. For example, a control "button" may be provided which when selected by the user would indicate to the recommender 908 that the search should be biased based on the historical data, as opposed to the purely ephemeral data collected by means of the exploratory process. Thus, advantageously, the user can toggle the recommender 908 to perform a more conventional/historical search and an ephemeral search.

In general, the techniques disclosed herein may be used to generate recommendations of products (P1 to PN) from a product database. (DB) At a minimum, the product database (DB may be indexed based on a product taxonomy along N dimensions (DIM1 to DIMN), as described above.

In order to determine the taste profile for a user, the user is engaged in an exploratory procedure in which the user's preference for products from the product database is systematically tested in order to learn the uses taste preferences along the N dimensions.

In one embodiment, a set of numbers with a predefined ranges may be used to capture each dimension of a product.

During the exploratory procedure, system knowledge of product affinities may be used to determine products to show to the user in order to calibrate the user's preferences. However, unlike other such systems, the exploratory procedure deliberately shows the user products at the user may not have a preference for an order to determine the boundaries of the uses taste profile.

In one embodiment, the taste profile for user may be expressed as a set of numbers that map to the set of numbers used to represent a products N dimensions.

Advantageously, the uses taste profile may be calibrated each time a user wishes to receive a recommendation thereby to prevent or at least diminish historical information about the user from constraining the recommendations for the user. Thus, a more ephemeral search may be performed.

The processing steps described above may be implemented as modules. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by a processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive might be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media can include a computer usable storage medium having stored therein computer software or data.

In alternative embodiments, the database modules might include other similar instrumentalities for allowing computer programs or other instructions or data to be loaded into the computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

The communications module might include various communications interfaces such as an Ethernet, network interface card, WiMedia, IEEE 802.XX or other interface), or other communications interface. Data transferred via communications interface might typically be carried on signals, which can be electronic, electromagnetic (which includes optical) or other signals capable of being exchanged by a given communications interface. These signals might be provided to communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for generating recommendations for a user from a product database enabled in a cloud-based system including a plurality of servers, the method comprising:
   determining a taxonomy for the product database, said taxonomy comprising a plurality of values assigned to each product in the product database along N dimensions;
   performing an exploratory procedure in which the user is systematically exposed to products from the product database in order to test user's preference for the products in the product database;
   generating a style profile for the user based on the user's indicated preferences, wherein the style profile is generated based on recording at least one value for each of the plurality of dimensions of a product liked by the user and at least one value for each of the plurality of dimensions of a product disliked by the user associated with a user ID of the user; and
   generating the recommendations of a product from the product database based on the user's style profile for the user.

2. The method of claim 1, wherein during the exploratory procedure, the limits of a user's preferences for the products in the product database are tested by randomly exposing the user to products in the product database.

3. The method of claim 1, wherein the user may indicate to generate the recommendations based on historic information about the user.

4. The method of claim 1, wherein the user may indicate to generate the recommendations based on ephemeral information about the user.

5. The method of claim 1, wherein generating the recommendation comprises using the user style profile to identify what the user might like based on product affinities.

6. The method of claim 1, wherein generating the user style profile comprises storing at least one of the values associated with products preferred by the user and the values associated with products not preferred by the user against a user id associated with the user.

7. A product recommendation system enabled in a cloud, comprising:
   a product database enabled in a plurality of servers configured to:
   tag products in the product database based on a product taxonomy along a plurality of dimensions;
   engage a user in an exploratory process by systematically exposing the user to products from the product database in order to determine user's preferences for the products from the product database in terms of the plurality of dimensions; and
   generate a user style profile based on the user's preferences for products, wherein the style profile is generated based on recording at least one value for each of the plurality of dimensions of a product liked by the user and at least one value for each of the plurality of dimensions of a product disliked by the user associated with a user ID of the user.

8. The product recommendation system of claim 7, wherein the style profile of the user is used in order to generate recommendations of products from the product database for the user.

9. The product recommendation system of claim 8, wherein the recommendations of products are generated based on an ephemeral search.

10. The product recommendation system of claim 9, wherein for the ephemeral search, recommendations are generated based on results from a current exploratory process that the user is engaged in and not on historically known information about the user.

11. A method for recommending a product from a product database to a user, wherein the product database is enabled in a cloud-based system including a plurality of servers, the method comprising:

determining an N-dimensional space representing a taxonomy associated with products in the product database, wherein each dimension includes a set of values;

transforming each product in the product database into the N-dimensional space; and performing a taste calibration process, comprising exposing the user to the products from the N-dimensional space;

capturing user's preference with regard to each of the products;

generating a taste profile for the user when user's taste is expressed as values assigned by the user for each dimension from the N-dimensional space, wherein the taste profile is generated based on recording at least one value for each of the dimensions in the taxonomy associated with a product liked by the user and at least one value for each of the dimensions in the taxonomy associated with a product disliked by the user, and wherein the user is associated with a user ID; and recommending a product from the product database to the user based on the user's taste profile.

12. The method of claim 11, wherein the recommendation of products is based on ephemeral information about the user.

13. The method of claim 12, further comprising storing the taste profile of the user.

14. The method of claim 11, wherein the recommendation of products from the product database is based on historical information about the user.

15. The method of claim 11, wherein recommending products from the database is based on the results of the taste calibration process only, without regard to historical information about the user.

* * * * *